United States Patent
Han

(10) Patent No.: US 9,710,112 B2
(45) Date of Patent: Jul. 18, 2017

(54) APPARATUS AND METHOD OF IDENTIFYING TOUCH AREA

(75) Inventor: Dong-Kyoon Han, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 1058 days.

(21) Appl. No.: 13/350,168

(22) Filed: Jan. 13, 2012

(65) Prior Publication Data

US 2012/0182259 A1 Jul. 19, 2012

(30) Foreign Application Priority Data

Jan. 13, 2011 (KR) .................. 10-2011-0003580

(51) Int. Cl.
G06F 3/044 (2006.01)
G06F 3/041 (2006.01)
H04B 1/707 (2011.01)

(52) U.S. Cl.
CPC ............ G06F 3/044 (2013.01); G06F 3/0418 (2013.01); H04B 1/707 (2013.01)

(58) Field of Classification Search
CPC ........................................ G06F 3/044
USPC ........................................ 345/173
See application file for complete search history.

(56) References Cited

U.S. PATENT DOCUMENTS 6,078,251 A * 6/2000 Landt et al. ............... 340/10.41
2004/0125860 A1 7/2004 Tojo et al.
2007/0109274 A1 * 5/2007 Reynolds ................. G06F 3/041
  345/173
2009/0009483 A1 * 1/2009 Hotelling .............. G06F 3/0416
  345/173
2009/0174675 A1 7/2009 Gillespie et al.
2010/0053097 A1 3/2010 Goh et al.
2010/0321334 A1 12/2010 Oda et al.

FOREIGN PATENT DOCUMENTS

CN       101310246       11/2008
CN       101930317       12/2010
EP       2 264 568       12/2010

(Continued)

OTHER PUBLICATIONS

Chinese Office Action dated Jan. 19, 2016 issued in counterpart application No. 201210065548.5, 14 pages.

(Continued)

Primary Examiner — Kent Chang
Assistant Examiner — Sepideh Ghafari
(74) Attorney, Agent, or Firm — The Farrell Law Firm, P.C.

(57) ABSTRACT

Methods and apparatus are provided for identifying coordinates of a touch area on a touch screen panel based on a capacitive scheme. The touch screen panel has a first electrode layer having first electrode lines aligned in a first direction and a second electrode layer having second electrode lines aligned in a second direction. A signal generation unit generates a spread spectrum signal and supplies the spread spectrum signal to the first electrode layer. A signal restoration unit processes a band restoration for a signal input from the second electrode layer. A touch area coordinate identification unit identifies the coordinates of the touch area on the touch screen panel from a signal input from the signal restoration unit.

18 Claims, 11 Drawing Sheets

(56) References Cited

FOREIGN PATENT DOCUMENTS

JP          2009-516295     4/2009
KR          1019980035921   8/1998

OTHER PUBLICATIONS

European Search Report dated Oct. 6, 2015 issued in counterpart application No. 12150854.3-1507, 6 pages.
Korean Office Action dated Dec. 21, 2016 issued in counterpart application No. 10-2011-0003580, 12 pages.

* cited by examiner

APPARATUS AND METHOD OF IDENTIFYING TOUCH AREA

PRIORITY

This application claims priority under 35 U.S.C. §119(a) to a Korean Patent Application entitled "Apparatus and Method of Identifying Touch Area", filed in the Korean Intellectual Property Office on Jan. 13, 2011 and assigned Serial No. 10-2011-0003580, the contents of which are incorporated herein by reference.

BACKGROUND OF THE INVENTION

1. Field of the Invention

The present invention relates generally to a method and an apparatus for input on a touch screen, and more particularly, to a method and an apparatus for input on a capacitive-type touch screen.

2. Description of the Related Art

Referring initially to FIG. 1, a diagram illustrates a side-sectional view of a mutual touch screen panel. The mutual touch screen panel includes a first electrode layer 11 in a lower section thereof, and a second electrode layer 13 spaced apart from the first electrode layer 11 by a predetermined distance. The first electrode layer 11 and the second electrode layer 13 are separated by a substrate 15 having a predetermined dielectric constant. The first electrode layer 11 and the second electrode layer 13 include a plurality of electrode lines. The electrode lines of the first electrode layer 11 and the electrode lines of the second electrode layer 13 cross. An upper portion of the touch screen panel further includes a tempered glass 17 for protecting the second electrode layer 13.

The first electrode layer 11 is connected to a first circuit for applying a predetermined signal. When the predetermined signal is applied to the first electrode layer 11 from the first circuit, an electric field is generated between the first electrode layer 11 and the second electrode layer 13. The predetermined signal applied to the first electrode layer 11 is transferred to the second electrode layer 13 through the electric field. The signal transferred to the second electrode layer 13 is supplied to a second circuit. The second circuit determines a change in the signal transferred from the second electrode layer 13, identifies whether a touch is input, and identifies coordinates of an area in which the touch is input. Specifically, referring to FIG. 2, when a touch by a user 19 or a stylus pen is not input, the signal transferred from the second electrode layer 13 is in the form of a reference signal 21. However, when a touch by the user 19 or the stylus pen is input, a change of a contact strength detected in the second electrode layer 13 represents a pattern of a contact strength signal 22. Further, a change of a quantity of the electric field transferred from the second electrode layer 13 in the area in which the touch by the user 19 or the stylus pen is input is in the form of an output signal 23. Specifically, the output signal 23 has a form indicating a relatively lower value than a predetermined level in a section 24 in which the touch is input, because the quantity of the electric field coupled to the second electrode layer 13 from the first electrode layer 11 is decreased by the contact with the user.

The second circuit identifies the contact strength signal 22 to determine whether the touch is input, and identifies coordinates of the area in which the touch is input.

The mutual touch screen panel senses the change in capacitance by the contacted conductor. Accordingly, as the change in capacitance increases, there is a greater likelihood of operation without error. In order to increase the change in capacitance, it is preferable to increase a contact area. The touch screen device has a sensing performance that is sufficient to detect a change in capacitance corresponding to a contact of a finger. The change in capacitance by the contact of the finger is a very small quantity of several picoFarads (pF). Accordingly, a great deal of effort is required to decrease noise influence in the processing of signal detection.

Although the touch screen device operates at a satisfactory level in a user interface by a finger, the sensitivity of the touch screen device must be improved to detect an input in an approach process or to perform an operation by a contact of a conductive pen having a contact area smaller than that of the finger. The improvement in sensitivity means a decrease in a threshold level, such that the touch screen device responds to a smaller signal. However, if the threshold level is only decreased when at least a predetermined level of a signal-to-noise ratio is not secured, a probability of generating a malfunction may be increased.

A method of amplifying a size of a signal does not have a means for isolating a noise signal before the amplification. It is impossible to obtain any gain in the signal-to-noise ratio because a noise level is simultaneously amplified.

SUMMARY OF THE INVENTION

The present invention has been made to address at least the above problems and/or disadvantages and to provide at least the advantages described below. Accordingly, an aspect of the present invention provides an apparatus and a method of identifying coordinates of a touch area, which can improve a sensitivity and simultaneously decrease an error.

Another aspect of the present invention provides an apparatus for identifying coordinates of a touch area, which can fix a touch screen panel in a relatively lower part than a display panel.

Another aspect of the present invention provides an apparatus for identifying coordinates of a touch area, which can simultaneously transmit a spread spectrum signal to multiple channels by using different spread spectrum codes.

In accordance with an aspect of the present invention, an apparatus is provided for identifying coordinates of a touch area on a touch screen panel based on a capacitive scheme. The apparatus includes the touch screen panel having a first electrode layer having first electrode lines aligned in a first direction and a second electrode layer having second electrode lines aligned in a second direction. The second direction is different from the first direction. An electric field exists between the first electrode layer and the second electrode layer. The apparatus also includes a signal generation unit for generating a spread spectrum signal and supplying the spread spectrum signal to the first electrode layer. The apparatus additionally includes a signal restoration unit for processing a band restoration for a signal input from the second electrode layer. The apparatus further includes a touch area coordinate identification unit for identifying the coordinates of the touch area on the touch screen panel from a signal output from the signal restoration unit.

In accordance with another aspect of the present invention, a method is provided for identifying coordinates of a touch area on a touch screen panel based on a capacitive scheme. A spread spectrum signal is generated. The generated spread spectrum signal is supplied to a first electrode layer. The first electrode layer is formed in the touch screen panel and has first electrode lines aligned in a first direction. A band restoration is processed for a signal input from a second electrode layer, which is formed in the touch screen panel and has second electrode lines aligned in a second direction. The second direction is different from the first direction. An electric field exists between the first electrode layer and the second electrode layer. The coordinates of the touch area on the touch screen panel are identified from the band restored signal.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
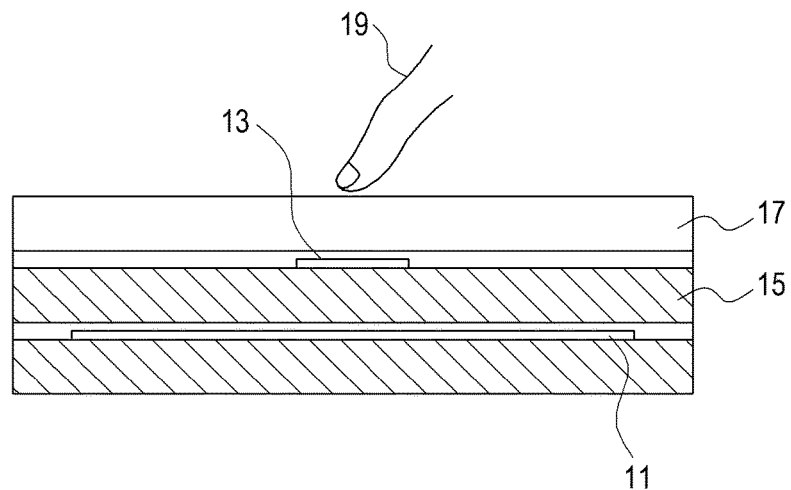
FIG. 1 is diagram illustrating a side-sectional view of a mutual touch screen panel.
Figure 2:
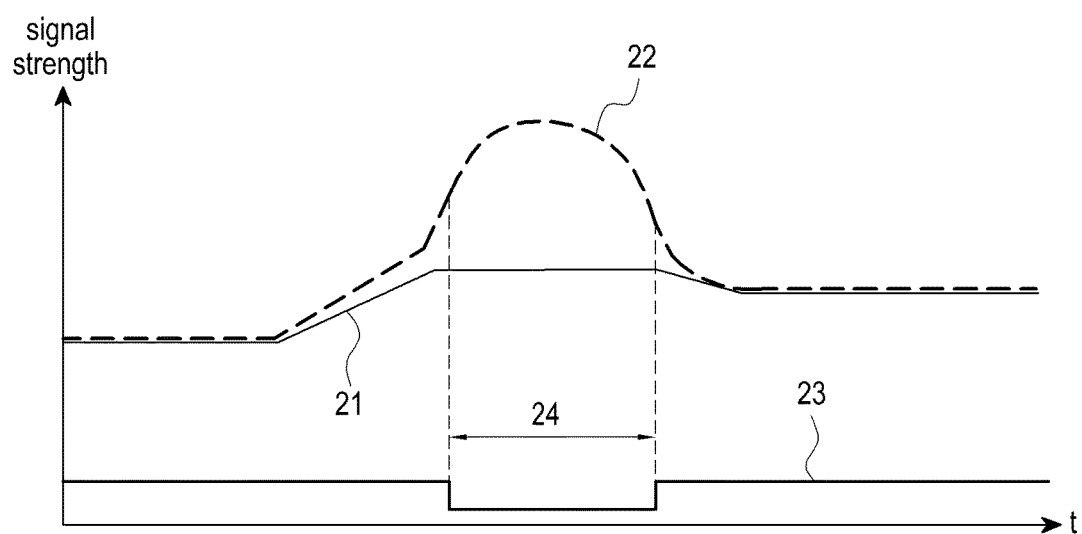
FIG. 2 is a graph illustrating an example of a signal transmitted to a second electrode layer by a mutual touch screen panel.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Figure 3:
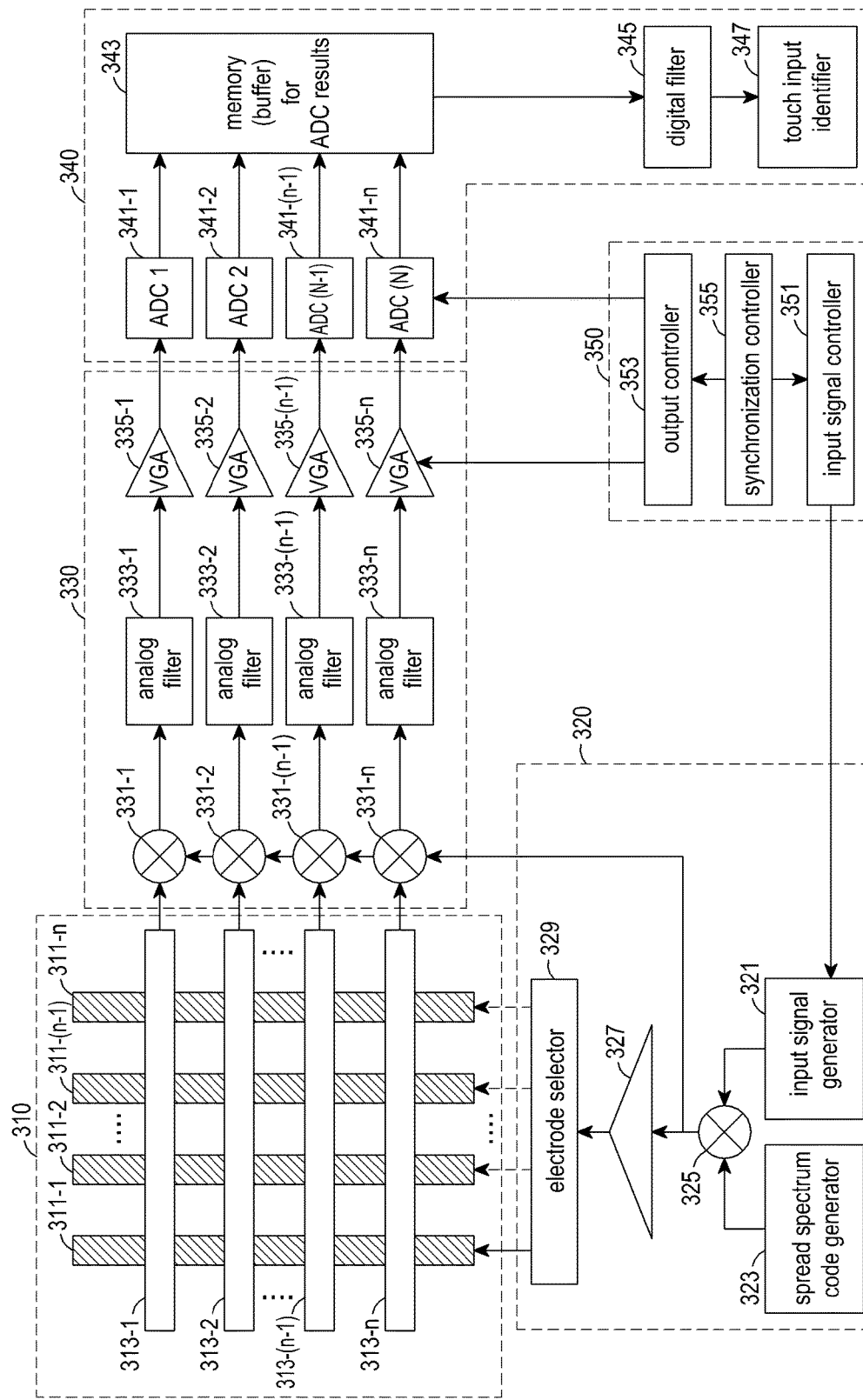
FIG. 3 is a diagram illustrating a construction of an apparatus for identifying coordinates of a touch area, according to an embodiment of the present invention.

FIG. 3 is a diagram illustrating a construction of an apparatus for identifying coordinates of a touch area, according to an embodiment of the present invention. The apparatus for identifying the coordinates of the touch area includes a touch screen panel 310, a signal generating unit 320, a signal restoration unit 330, and a touch area coordinate identification unit 340.

The touch screen panel 310 includes a first electrode layer having a first pattern aligned in a first direction, and a second electrode layer having a second pattern aligned in a second direction, which is different from the first direction. For example, the first electrode layer has the first pattern including multiple first electrode lines 311-1 to 311-n aligned in a lengthwise direction and spaced apart from each other by the same predetermined distance. The second electrode layer has the second pattern including multiple second electrode lines 313-1 to 313-n aligned in a widthwise direction while vertically crossing the multiple first electrode lines 311-1 to 313-n, and spaced apart from each other by the same predetermined distance.

The multiple first electrode lines 311-1 to 311-n formed in the first electrode layer are connected to the signal generating unit 320 and generate an electric field having a size corresponding to that of a signal supplied from the signal generating unit 320. The multiple second electrode lines 313-1 to 313-n formed in the second electrode layer are connected to the signal restoration unit 330. The signal transmitted to the multiple second electrode lines 313-1 to 313-n through the electric field is supplied to the signal restoration unit 330.

The signal generating unit 320 generates a spread spectrum signal and supplies the spread spectrum signal to the multiple first electrode lines 311-1 to 311-n of the first electrode layer.

Specifically, according to an embodiment of the present invention, the signal generating unit 320 includes an input signal generator 321 for generating an input signal required for identifying coordinates of a touch area, a spread spectrum code generator 323 for generating a spread spectrum code, and a spread spectrum processor 325 for combining the input signal and the spread spectrum code and generating the spread spectrum signal.

Figure 4A:
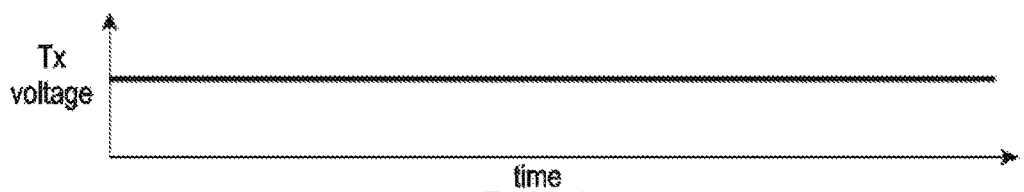
FIG. 4A is a graph illustrating an input signal generated by an apparatus for identifying coordinates of a touch area, according to an embodiment of the present invention.

For example, the input signal generator 321 may generate an input signal, i.e. a DC input signal, having a predetermined level of a voltage value as shown in FIG. 4A. The DC input signal may be interrupted by a basic capacitance formed in a dielectric body, such as a film and a glass, formed between the first electrode layer and the second electrode layer. Thus, in an embodiment of the present invention, the spread spectrum signal combined with the spread spectrum code is used as a signal transmitted between the first electrode layer and the second electrode layer.

Although the DC input signal serves as the input signal in an embodiment of the present invention, the present invention is not limited thereto, and the input signal may be a signal having a predetermined frequency band.

Figure 4B:
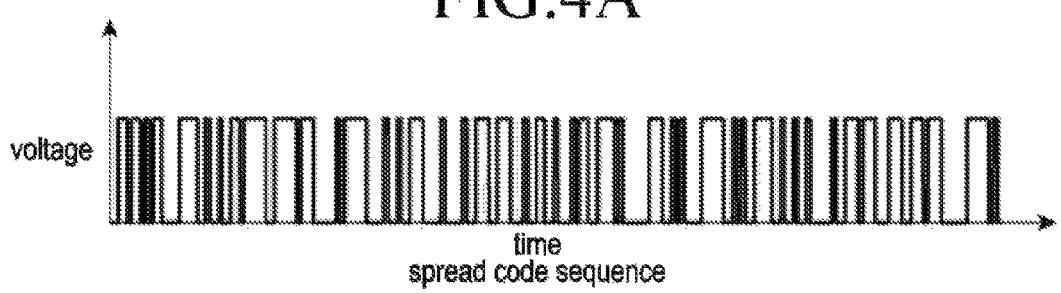
FIG. 4B is a graph illustrating a spread spectrum code generated by an apparatus for identifying coordinates of a touch area, according to an embodiment of the present invention.

The spread spectrum code generator 323 generates the spread spectrum code shown in FIG. 4B. The spread spectrum processor 325 multiplies the input signal by the spread spectrum code to generate the spread spectrum signal. A frequency of the spread spectrum code preferably has a relatively higher frequency than a frequency of the input signal. A spread spectrum multiple may be defined by a ratio of the frequency of the spread spectrum code to the frequency of the input signal. The frequency band of the input signal is spread as much as the spread spectrum multiple. The frequency band of the noise introduced through the multiple electrode lines is also spread as much as the spread spectrum multiple. An original power of the noise is reduced as much as a reciprocal of the spread spectrum multiple. Accordingly, it is preferable to set the spread spectrum multiple to be higher than 1.

For example, the spread spectrum code generator 323 may generate an orthogonal code, such as, for example, a Walsh-Hadamard code, a Barker code, and Orthogonal Variable Spreading Factor (OVSF) code, or a pseudo random sequence code, such as, for example, an m-sequence code, a Gold sequence code, and a Kasami code.

The signal generating unit 320 further includes an electrode selector 329 for sequentially supplying the spread spectrum signal to the multiple first electrode lines 311-1 to 311-n. The electrode selector 329 sequentially selects each of the multiple first electrode lines 311-1 to 311-n and supplies the spread spectrum signal to the selected first electrode lines 311-1 to 311-n.

Figure 4C:
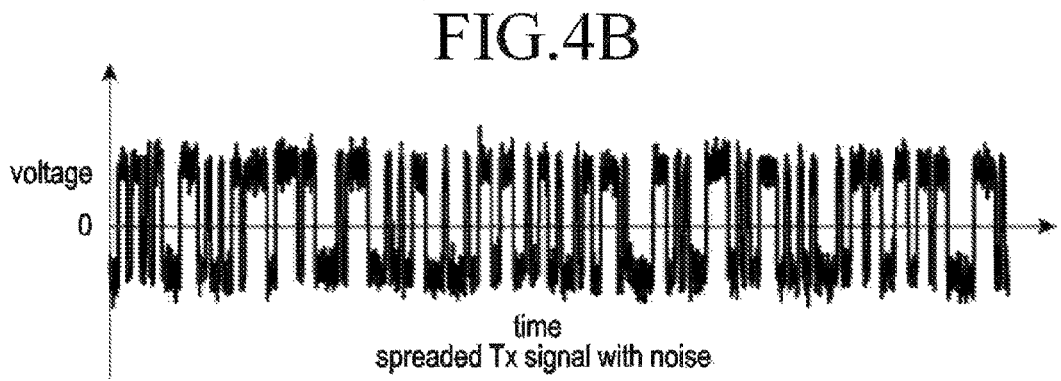
FIG. 4C is a graph illustrating a spread spectrum signal supplied to a signal restoration unit by an apparatus for identifying coordinates of a touch area, according to an embodiment of the present invention.

Accordingly, the spread spectrum signal is transmitted from the multiple first electrode lines 311-1 to 311-n to the multiple second electrode lines 313-1 to 313-n. A noise generated between the multiple first electrode lines 311-1 to 311-n and the multiple second electrode lines 313-1 to 313-n may be introduced, and a signal detected in the multiple second electrode lines 313-1 to 313-n may be represented as illustrated in FIG. 4C.

According to an embodiment of the present invention, the input signal generator 321 generates the input signal having the predetermined level of the voltage value and the electrode selector 329 sequentially supplies the spread spectrum signal to the multiple first electrode lines 311-1 to 311-n. However, the present invention is not limited thereto. Alternatively, the input signal generator 321 may generate two or more different input signals and the electrode selector 329 may simultaneously supply signals obtained by multiplying each of the two or more input signals by an identical spread spectrum code or different spread spectrum codes to different first electrode lines among the multiple first electrode lines 311-1 to 311-n. Further, a frequency of a signal or a waveform of a signal may be differently set for the two or more different input signals.

The signal generating unit 320 further includes an amplifier 327 for amplifying a strength of the spread spectrum signal. The amplifier 327 may be disposed somewhere between the spread spectrum code generator 323 and the electrode selector 329.

Further, the signal generating unit 320 may include a plurality of input signal generators 321, a plurality of spread spectrum generators 323, a plurality of spread spectrum processors 325, and a plurality of amplifiers 327. Further, at least one signal may be selected and output by the electrode selector 329.

The signal restoration unit 330 processes a band restoration for the signal supplied from the multiple second electrode lines 313-1 to 313-n.

The signal restoration unit 330 includes multiple spread spectrum restoration units 331-1 to 331-n connected to each of the multiple second electrode lines 313-1 to 313-n. The spread spectrum restoration units 331-1 to 331-n are configured to synchronize the same code as the spread spectrum code generated in the spread spectrum code generator 323, and apply the synchronized code to the signal supplied from the multiple second electrode lines 313-1 to 313-n. The multiple spread spectrum restoration units 331-1 to 331-n may be multipliers for multiplying the signals supplied from the multiple second electrode lines 313-1 to 313-n by the spread spectrum code generated in the spread spectrum code generator 323.

Figure 4D:
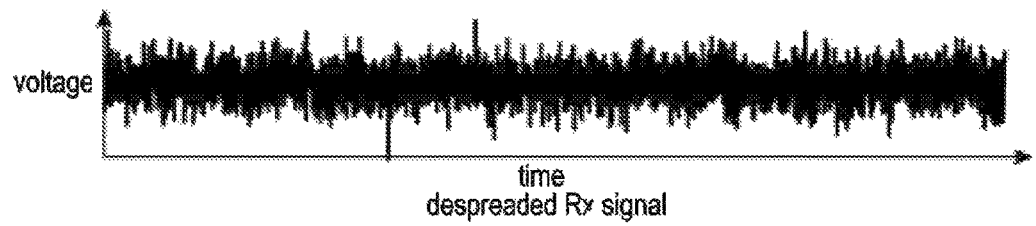
FIG. 4D is a graph illustrating a signal in which a spread spectrum code is applied to a spread spectrum signal supplied to a signal restoration unit by an apparatus for identifying coordinates of a touch area, according to an embodiment of the present invention.
Figure 5A:
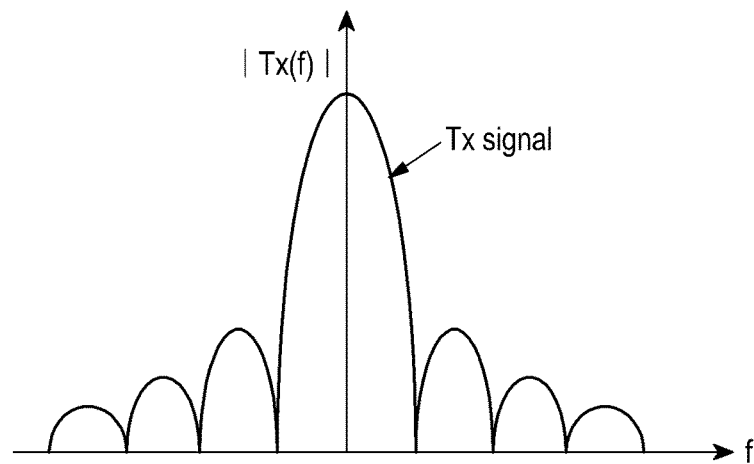
FIG. 5A is a graph illustrating a frequency characteristic of an input signal generated by an apparatus for identifying coordinates of a touch area, according to an embodiment of the present invention.
Figure 5B:
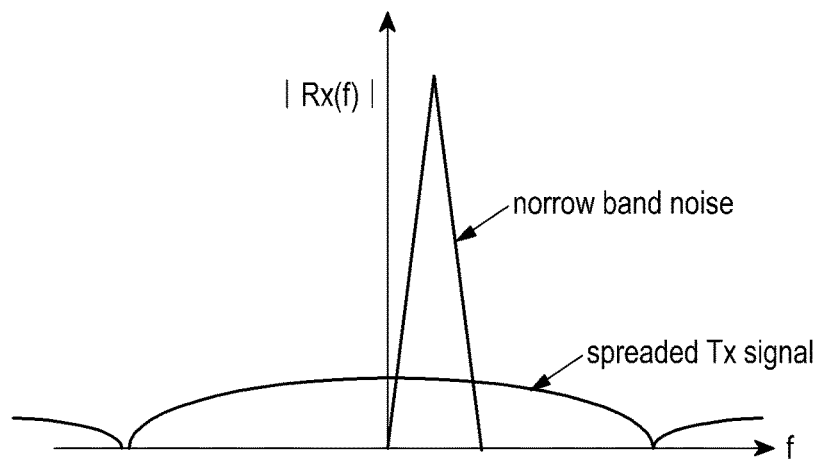
FIG. 5B is a graph illustrating a frequency characteristic of a spread spectrum signal and a noise generated by applying a spread spectrum code to the signal of FIG. 5A, according to an embodiment of the present invention.

An example of a band restored signal generated by band restoring the signal of FIG. 4C by the spread spectrum restoration units 331-1 to 331-n is illustrated in FIG. 4D. In the band restored signal, a frequency band is restored in the spread spectrum signal supplied to the multiple first electrode lines 311-1 to 311-n. However, a frequency band of a noise component introduced during the process of the transmitting of the signal through the touch screen panel 310 is spread so that the strength of the signal may be decreased. Specifically, the signal generating unit 320 generates an input signal (Tx signal) (see FIG. 5A) having a predetermined frequency band and the spread spectrum signal (spread Tx signal) (see FIG. 5B) widely spread in the entire frequency band in which a power of the input signal (Tx signal) is spread through the spread spectrum processing for the input signal. The spread spectrum signal (spread Tx signal) is transmitted to the signal restoration unit 330 through the first electrode layer and the second electrode layer. The spread Tx signal is picked up by the electrodes formed in the first electrode layer and the second electrode layer, so that a narrow band noise (see FIG. 5B) having a predetermined frequency band may be generated. The signal restoration unit 330 performs the band restoration of the input signal (Tx signal) by using the spread spectrum code, so that the band spread input signal is restored to the original signal (restored Tx signal after despreading) (see FIG. 5C), and the narrow band noise component is spread by the spread spectrum code to be converted to a band spread noise signal (suppressed narrow band noise due to despreading)

Figure 5C:
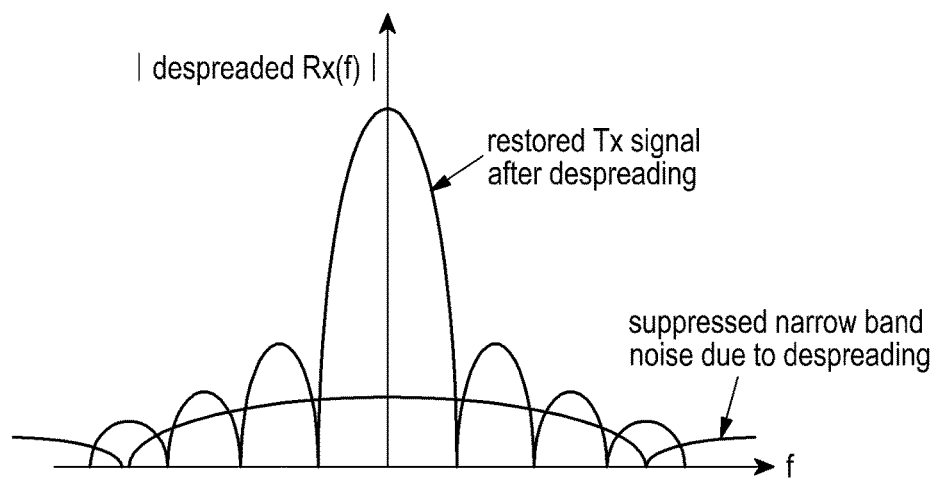
FIG. 5C is a graph illustrating a result of an application of a band restoration to the signal of FIG. 5B, according to an embodiment of the present invention.

(see FIG. 5C). Accordingly, the frequency band of the narrowband noise component having a strong power in a narrowband is spread, so that the noise component is changed to the noise having a relatively lower power than the input signal.

In order to remove an additional noise component distributed in a band other than the band of the signal supplied from the signal generating unit 320, the signal restoration unit 330 further includes filters 333-1, 333-2, . . . , 333-(n-1), and 333-n connected to the spread spectrum restoration units 331-1 to 331-n, respectively, and configured to remove the predetermined frequency band including the noise component. The filters 333-1, 333-2, . . . , 333-(n-1), and 333-n remove the additional noise component and may employ an analog filter, such as, for example, an analog lowpass filter or an analog bandpass filter.

Figure 4E:
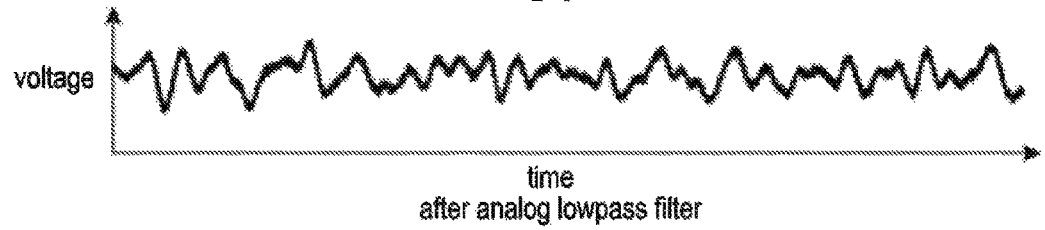
FIG. 4E is a graph illustrating a result of a filtering processing for a predetermined frequency band of the signal of FIG. 4D, according to an embodiment of the present invention.

As such, the band restored signal of FIG. 4D passes through the filters 333-1, 333-2, . . . , 333-(n-1), and 333-n, so that the noise component of the band restored signal may be removed, as illustrated in FIG. 4E.

The signal restoration unit 330 further includes amplifiers, such as, for example, Variable Gain Amplifiers (VGAs) 335-1, 335-2, . . . , 335-(n-1), and 335-n connected to the filters 333-1, 333-2, . . . , 333-(n-1), and 333-n, respectively, and configured to amplify the filtered signal.

The touch area coordinate identification unit 340 identifies coordinates of a touch area based on the signal output from the signal restoration unit 330.

The touch area coordinate identification unit 340 includes Analog-Digital Converter (ADC) processors 341-1, 341-2, . . . , 341-(n-1), and 341-n for analog-digital converting the signal output from the signal restoration unit 330. The touch area coordinate identification unit 340 also includes a touch input identifier 347 for identifying a level change of the converted signal and identifying whether a touch is input and coordinates of the area in which the touch is input. For example, the touch input identifier 347 identifies whether the restored signal has a value relatively smaller than a predetermined signal strength (voltage value) based on the restored input signal, and identifies that the touch is input when the restored signal has the value relatively smaller than the predetermined signal strength (voltage value). The change level of the signal by the touch input may be increased compared to a predetermined reference signal depending on the construction of the amplifiers 335-1, 335-2, . . . , 335-(n-1), and 335-n included in the signal restoration unit 330. Further, the touch input identifier 347 identifies the first electrode lines 311-1 to 311-n of the first electrode layer selected for the transmission of the current input signal and identifies the second electrode line 313-1 to 313-n of the second electrode layer in which the restored signal has a relatively smaller (or larger) value than the predetermined signal strength (voltage value), to determine a crossed point between the identified first electrode line and the identified second electrode line as the area in which the touch is input.

The touch area coordinate identification unit 340 simultaneously transmits the analog digital converted signal to the touch input identifier 347 and the touch input identifier 347 may receive signals equal to the number of the multiple second electrode lines 313-1 to 313-n and simultaneously process the signals. However, in order to simultaneously process the signals equal to the number of the multiple second electrode lines 313-1 to 313-n by the touch input identifier 347, a complexity of an internal construction of the touch input identifier 347 may be increased. Accordingly, the touch area coordinate identification unit 340 stores the analog digital converted signal in a memory 343 and sequentially supplies the signal stored in the memory 343 to the touch input identifier 347.

Figure 4F:
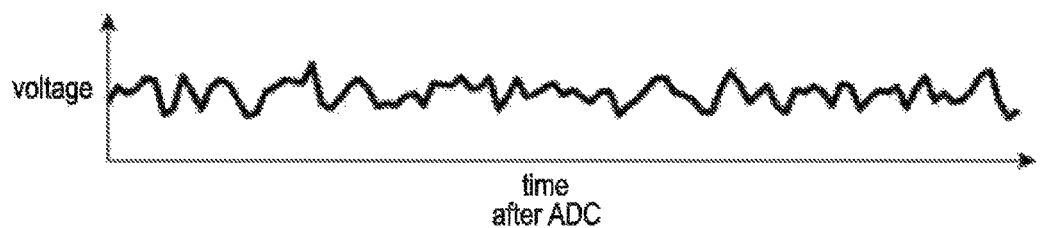
FIG. 4F is a graph illustrating a result of an analog-digital converted signal of FIG. 4E, according to an embodiment of the present invention.
Figure 4G:
FIG. 4G is a graph illustrating a result of an application of a discrete Finite Impulse Response (FIR) filter to the signal of FIG. 4F, according to an embodiment of the present invention.

Further, the signal restored through the signal restoration unit 330 may include a background white noise. Specifically, the background white noise may be evenly distributed in the entire band, so it may not be removed through the signal restoration unit 380, as shown in FIG. 4E. Accordingly, in order to remove the background white noise, sufficient data is received through an over sampling and a digital filter 345, such as a moving average filter, is applied when the analog digital converted signal shown in FIG. 4F is analog digital converted. For example, the digital filter 345 may be a discrete FIR filter for processing FIR filtering. Through using the digital filter, it is possible to effectively remove the noise generated in the touch screen panel 310, and it is possible to restore the input signal generated in the signal generation unit 320, as illustrated in FIG. 4G. Accordingly, it is possible to accurately identify whether the touch is input by using the restored input signal without influence of the noise, as shown in FIG. 4G.

Further, the apparatus for identifying the coordinates of the touch area, according to an embodiment of the present invention, effectively controls the noise generated in the display panel or the touch screen panel and variously changes the position of the first electrode layer and the second electrode layer included in the touch screen panel 310.

Figure 6A:
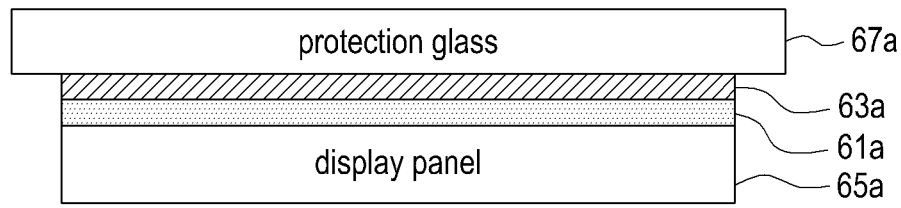
FIG. 6A is a diagram illustrating a touch screen panel included in an apparatus for identifying coordinates of a touch area, according to an embodiment of the present invention.

FIG. 6A is a diagram illustrating a touch screen panel included in an apparatus for identifying coordinates of a touch area, according to an embodiment of the present invention. Both a first electrode layer 61a and a second electrode layer 63a of the touch screen panel are formed on an upper surface of a display panel 65a. A protection glass 67a may be formed on the second electrode layer 63a.

Figure 6B:
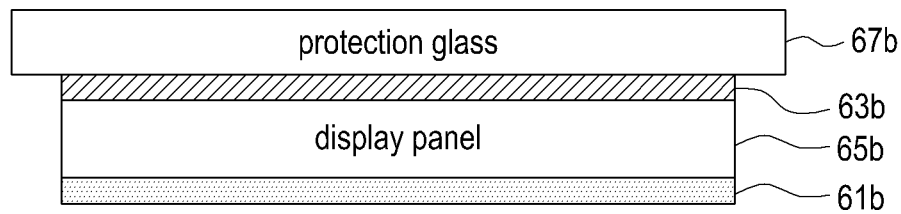
FIG. 6B is a diagram illustrating a touch screen panel included in an apparatus for identifying coordinates of a touch area, according to an embodiment of the present invention.

FIG. 6B is a diagram illustrating a touch screen panel included in an apparatus for identifying coordinates of a touch area, according to another embodiment of the present invention. A display panel 65b may be positioned on a first electrode layer 61b of the touch screen panel, a second electrode layer 63b may be positioned on the display panel 65b, and a protection glass 67b may be formed on the second electrode layer 63b.

Figure 6C:
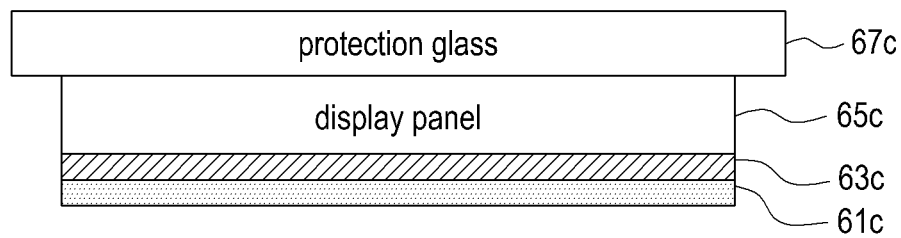
FIG. 6C is a diagram illustrating a touch screen panel included in an apparatus for identifying coordinates of a touch area, according to an embodiment of the present invention.

FIG. 6C is a diagram illustrating a touch screen panel included in an apparatus for identifying coordinates of a touch area, according to another embodiment of the present invention. A first electrode layer 61c and a second electrode layer 63c of the touch screen panel may be formed on a lower surface of a display panel 65c, and a protection glass 67c may be formed on the display panel 65c. When both the first electrode layer 61c and the second electrode layer 63c of the touch screen panel are disposed on the lower surface of the display panel 65c, a separate electrode layer, etc. may not be formed on the display panel 65c. Accordingly, the display panel 65c may be directly exposed to a user and a displayed image quality may be relatively improved.

Referring back to FIG. 3, the apparatus for identifying the coordinates of the touch area, according to an embodiment of the present invention, further includes a signal control unit 350 for controlling a synchronization of the signal generation unit 320, the signal restoration unit 330, and the touch area coordinate identification unit 340. Specifically, the signal control unit 350 includes an input signal controller 351 for controlling a type of the input signal or a signal strength (i.e., power). The signal control unit 350 also includes an output controller 353 for controlling gain values of the amplifiers 335-1, 335-2, . . . , 335-(n-1), and 335-n included in the signal restoration unit 330 and sampling periods of the ADC processors 341-1, 341-2, ..., 341-(n-1), and 341-n included in the touch area coordinate identification unit 340. The signal control unit 350 further includes a synchronization controller 355 for controlling a synchronization between the input signal controller 351 and the output controller 353.

Figure 7:
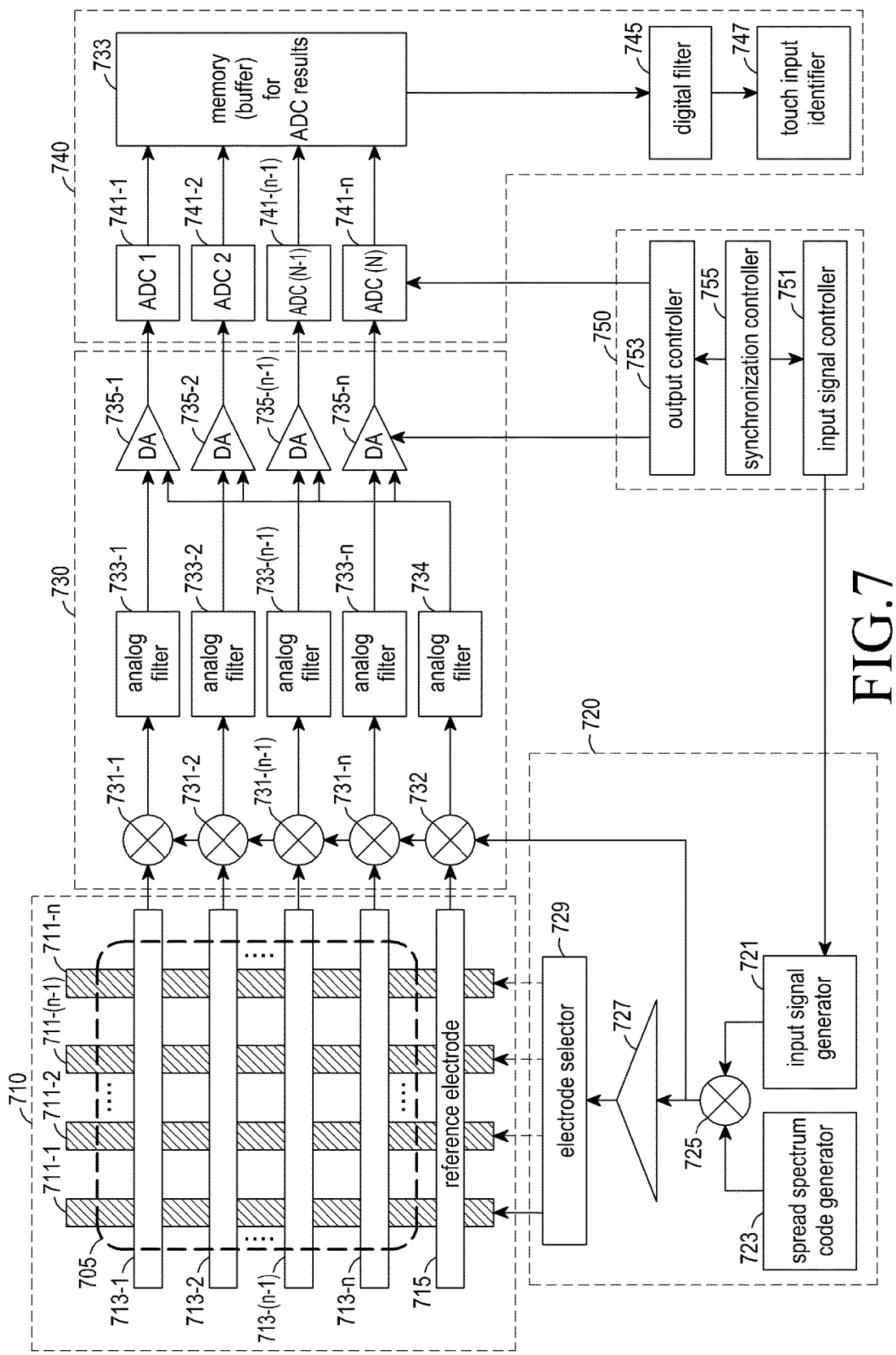
FIG. 7 is a diagram illustrating a construction of an apparatus for identifying coordinates of a touch area, according to an embodiment of the present invention.

FIG. 7 is a diagram illustrating a construction of an apparatus for identifying coordinates of a touch area, according to an embodiment of the present invention. The apparatus for identifying the coordinates of the touch area includes a touch screen panel 710, a signal generating unit 720, a signal restoration unit 730, a touch area coordinate identification unit 740, and a signal control unit 750.

The apparatus for identifying the coordinates of the touch area of FIG. 7 is substantially identical to the apparatus for identifying the coordinates of the touch area illustrated in FIG. 3. However, the apparatus for identifying the coordinates of the touch area of FIG. 7 is different in that a second electrode layer of the touch screen panel 710 includes a reference electrode 715 and the construction of the signal restoration unit 730 for processing the signal output from the reference electrode 715 is slightly different. Accordingly, the detailed descriptions of the signal generation unit 720, the touch area coordinate identification unit 740, and the signal control unit 750, are the same as those provided above with respect to the descriptions of the signal generation unit 320, the touch area coordinate identification unit 340, and the signal control unit 350. This includes the descriptions of components of these units, specifically, an input signal generator 721, a spread spectrum code generator 723, a spread spectrum processor 725, an amplifier 727 an electrode selector 729, ADC processors 741-1, 741-2, ..., 741-(n-1), and 741-n, a memory 733, a digital filter 745, a touch input identifier 747, an input signal controller 751, an output controller 753 and a synchronization controller 755.

The touch screen panel 710 includes a first electrode layer having a first pattern aligned in a first direction. The touch screen panel 710 also includes a second electrode layer that is spaced apart from the first electrode layer by a predetermined distance and has a second pattern aligned in a second direction, which is different from the first direction. For example, the first electrode layer includes multiple first electrode lines 711-1 to 711-n aligned in a lengthwise direction and spaced apart from each other by the same predetermined distance. The second electrode layer includes multiple second electrode lines 713-1 to 713-n aligned in a widthwise direction while vertically crossing the multiple first electrode lines 711-1 to 713-n, and spaced apart from each other by the same predetermined distance. The second electrode layer also includes the reference electrode 715. The multiple second electrode lines 713-1 to 713-n are used for identifying a difference in the signal strength and detecting coordinates of an area, in which a touch is input by a user. The multiple second electrode lines 713-1 to 713-n are formed in an area 705 in which the user can touch. The reference electrode 715 is formed in an area other than the area 705 in which a touch is generated by a user.

The multiple second electrode lines 713-1 to 713-n and the reference electrode 715 are connected to the signal restoration unit 730. The multiple second electrode lines 713-1 to 713-n and the reference electrode 715 supply the signal transmitted from the signal generation unit 720 through the multiple first electrode lines 711-1 to 711-n to the signal restoration unit 730.

The signal restoration unit 730 includes multiple spread spectrum restoration units 731-1 to 731-n connected to the multiple second electrode lines 713-1 to 713-n, respectively, and configured to synchronize the same code as a spread spectrum code generated in a spread spectrum code generator 723 and apply the synchronized code to the signal supplied from the multiple second electrode lines 713-1 to 713-n. Further, in order to remove an additional noise component distributed in a band other than the band of the signal supplied from the signal generating unit 720, the signal restoration unit 730 may further include analog filters 733-1, 733-2, ..., 733-(n-1), and 733-n connected to the spread spectrum restoration units 731-1 to 731-n, respectively, and configured to remove a predetermined frequency band including the noise component.

The signal restoration unit 730 further includes a reference spread spectrum restoration unit 732 connected to the reference electrode 715. The signal restoration unit 730 is configured to synchronize the same code as the spread spectrum code generated in the spread spectrum code generator 723 and apply the synchronized code to the signal transmitted from the reference electrode 715. Further, the signal restoration unit 730 may further include a reference filter 734 for removing a noise component of the predetermined frequency band included in a signal output from the reference spread spectrum restoration unit 732.

The multiple spread spectrum restoration units 731-1 to 731-n and the reference spread spectrum restoration unit 732 may be multipliers for multiplying the signal supplied to the second electrode layer by the spread spectrum code generated in the spread spectrum code generator 723.

Further, the signal restoration unit 730 further includes differential amplifiers (DAs) 735-1, 735-2, ..., 735-(n-1), and 735-n for receiving signals output from the filters 733-1, 733-2, ..., 733-(n-1), 733-n as first input signals and the signal output from the reference filter 734 as a common second input signal. The DAs 735-1, 735-2, ..., 735-(n-1), and 735-n differentially amplifying the first input signals and the second input signal.

Figure 8:
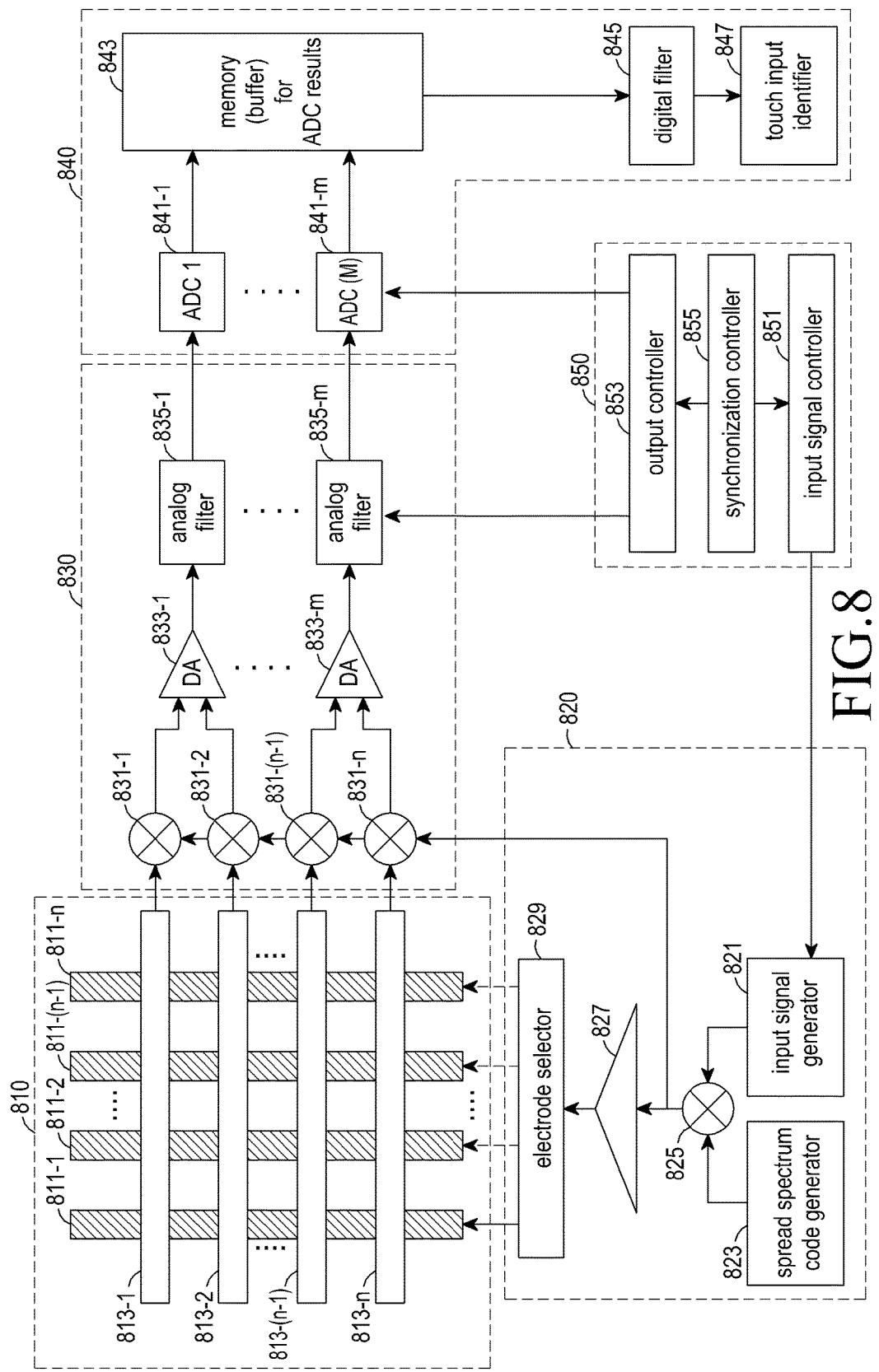
FIG. 8 is a diagram illustrating a construction of an apparatus for identifying coordinates of a touch area, according to an embodiment of the present invention.
Figure 9:
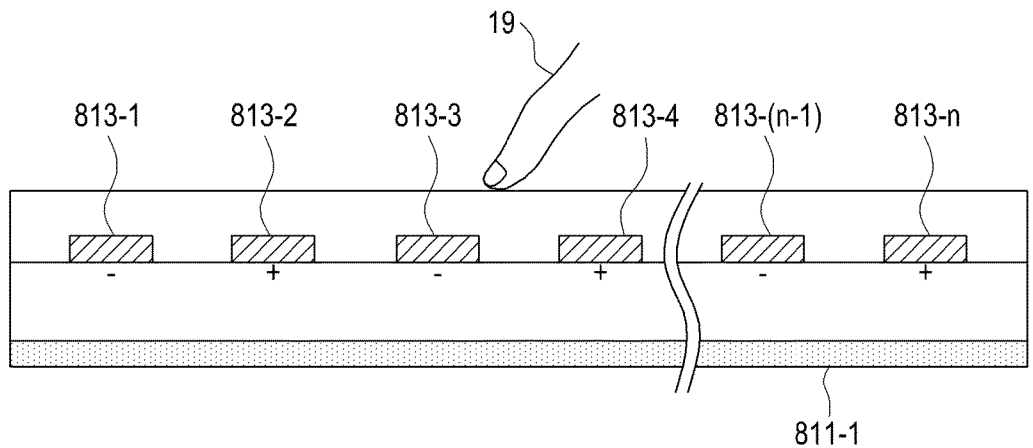
FIG. 9 is a diagram illustrating a touch screen panel of FIG. 8, according to an embodiment of the present invention.
Figure 10:
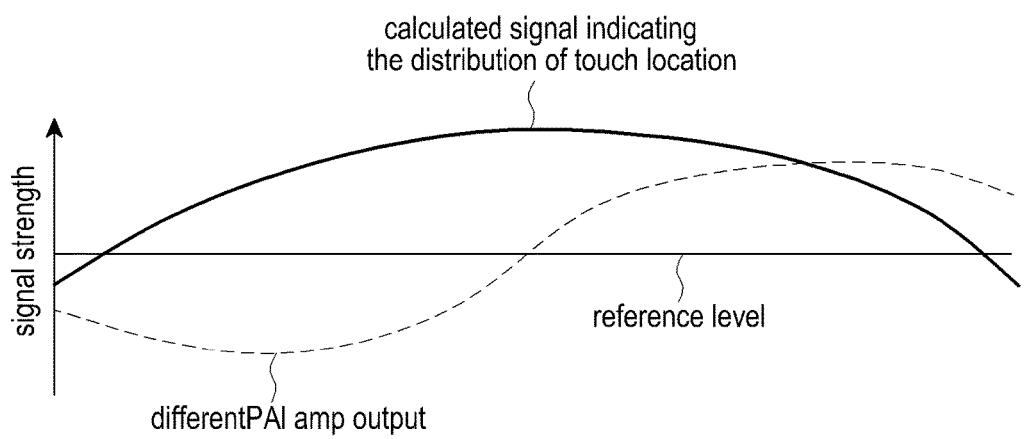
FIG. 10 is a graph illustrating a signal pattern of an apparatus for identifying coordinates of a touch area, according to an embodiment of the present invention.

FIG. 8 is a diagram illustrating a construction of an apparatus for identifying coordinates of a touch area, according to an embodiment of the present invention. FIG. 9 is a diagram illustrating a touch screen panel of FIG. 8, according to an embodiment of the present invention. FIG. 10 is a graph illustrating a pattern of an output signal of an apparatus for identifying coordinates of a touch area, according to an embodiment of the present invention.

Referring to FIG. 8, the apparatus for identifying the coordinates of the touch area includes a touch screen panel 810, a signal generating unit 820, a signal restoration unit 830, a touch area coordinate identification unit 840, and a signal control unit 850.

In the apparatus of FIG. 8, signals output from second electrode layers 813-1 to 813-n of the touch screen panel 810 are paired up and the paired signals are provided as an input to DAs 833-1 to 833-m included in the signal restoration unit 830. Accordingly, the apparatus for identifying the coordinates of the touch area of FIG. 8 has a construction that is substantially identical to that of FIG. 3. The apparatus of FIG. 8 differs in that the construction of the signal restoration unit 830 for processing the paired received signals is slightly different. The detailed descriptions of the touch screen panel 810, the signal generation unit 820, the touch area coordinate identification unit 840, and the signal control unit 850 are substantially identical to the descriptions of the touch screen panel 310, the signal generation unit 320, the touch area coordinate identification unit 340, and the signal control unit 350 of FIG. 3. This includes the descriptions of components of these units, specifically, multiple first electrode lines 811-1 to 811-$n$, multiple second electrode lines 813-1 to 813-$n$, an input signal generator 821, a spread spectrum code generator 823, a spread spectrum processor 825, an amplifier 827 an electrode selector 829, ADC processors 841-1, 841-2, . . . , 841-($n$-1), and 841-$n$, a memory 833, a digital filter 845, a touch input identifier 847, an input signal controller 851, an output controller 853 and a synchronization controller 855.

The signal restoration unit 830 includes multiple spread spectrum restoration units 831-1 to 831-$n$ connected to each of the multiple second electrode lines 813-1 to 813-$n$, respectively. The multiple spread spectrum restoration units 831-1 to 831-$n$ are configured to synchronize the same code as the spread spectrum code generated in the spread spectrum code generator 823 and apply the synchronized code to the signal transmitted from the multiple second electrode lines 813-1 to 813-$n$. The multiple spread spectrum restoration units 831-1 to 831-$n$ may be multipliers for multiplying the signals supplied from the multiple second electrode lines 813-1 to 813-$n$ by the spread spectrum code generated in the spread spectrum code generator 823.

In order to remove a background white noise introduced in the process of transmitting the input signal, the apparatus of FIG. 8 groups at least two electrode lines among the multiple second electrode lines 813-1 to 813-$n$ and sets the grouped electrode lines as a single signal processing channel. The number of channels may be equal to the number of signal processing lines formed in the signal restoration unit 830. For example, at least two electrode lines may be set to a single channel. The second electrode lines 813-1 and 813-2 are set to a first channel and the two electrode lines are set to a single channel in the same way. Accordingly, the second electrode lines 813-($n$-1) and 813-$n$ may be set to an $m^{th}$ channel (where, m=n/2).

In order to identify the spread spectrum signal in a unit of the channel, the signal restoration unit 830 includes DAs 833-1 to 833-$m$ for differentially amplifying signals output from two or more second electrode lines among the multiple electrode lines 813-1 to 813-$n$. Further, the signal restoration unit 830 groups the signals output from the second electrode lines 813-1, 813-2, . . . , 813-($n$-1), and 813-$n$ formed on the second electrode layer and the spread spectrum restoration units 831-1 to 831-$n$ in a unit of two signals, and connects the grouped signals to one of the DAs 833-1 to 833-$m$.

As illustrated in FIG. 9, the second electrode lines 813-2, 813-4, . . . , and 813-$n$, which are indicated with +, are connected to positive input ports of the DAs 833-1 to 833-$m$. The second electrode lines 813-1, 813-3, . . . , and 813-($n$-1), which are indicated with -, are connected to negative input ports of the differential amplifiers 833-1 to 833-$m$, respectively, where n is an even number. Accordingly the background white noise commonly introduced from the adjacent paired channels may be removed while passing through the differential amplifiers 833-1 to 833-$m$. The signals passing through the differential amplifiers 833-1 to 833-$m$ may represent a pattern of a first signal (differential amp output) illustrated in FIG. 10. Further, the touch area coordinate identification unit 840 processes the first signal and converts the processed signal to a second signal (calculated signal indicating the distribution of the touch location) indicating the actual touch location. The touch area coordinate identification unit 840 identifies whether a touch is input by the user by using the converted second signal, and identifies the area in which the touch is input.

In order to remove the additional noise component distributed in a band other than the band of the signal supplied from the signal generation unit 820, the signal restoration unit 830 further includes analog filters 835-1 to 835-$m$ connected to the DAs 833-1 to 833-$m$, respectively, and configured to remove the predetermined frequency band including the noise component.

Figure 11:
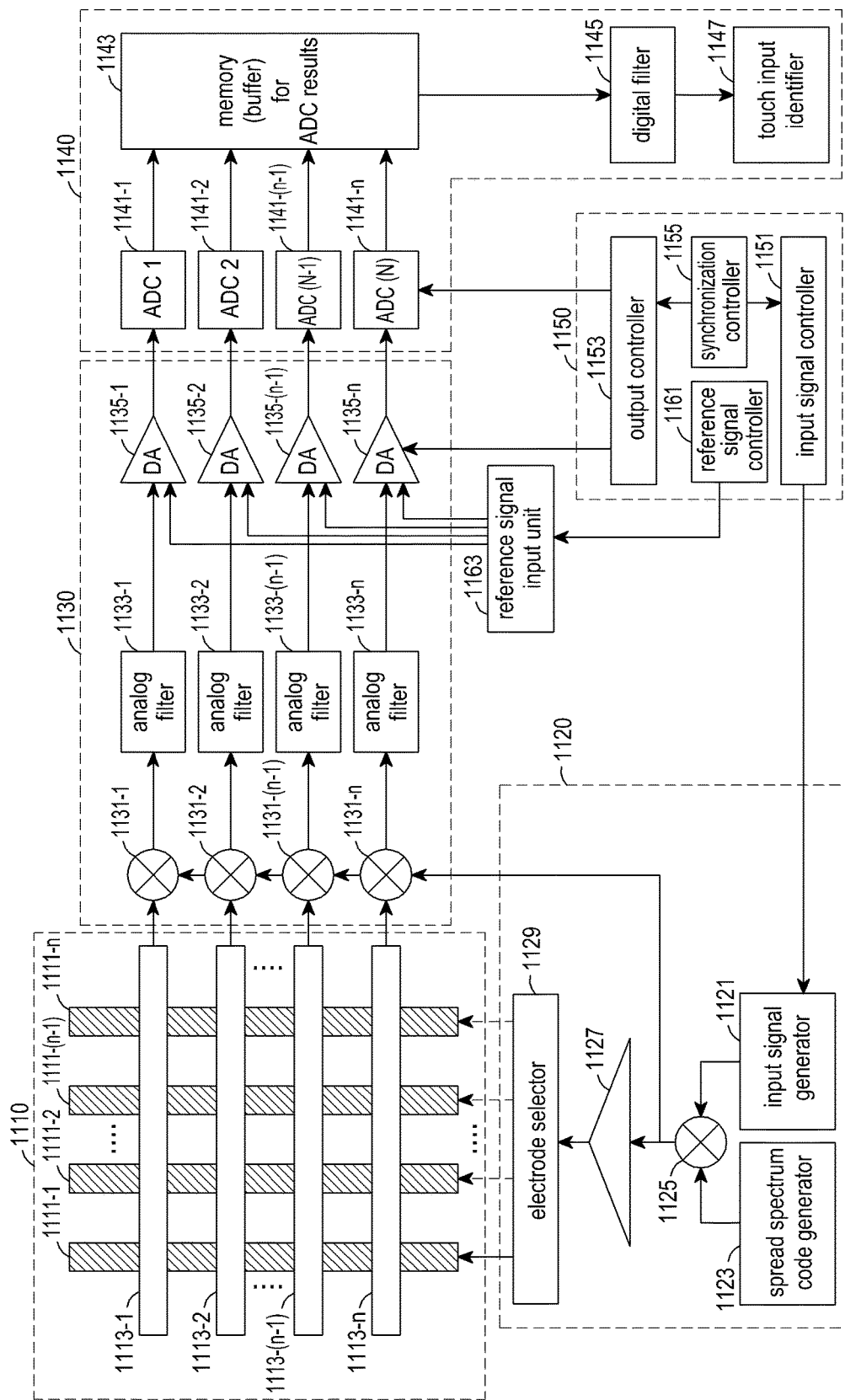
FIG. 11 is a diagram illustrating a construction of an apparatus for identifying coordinates of a touch area, according to an embodiment of the present invention.

FIG. 11 is a diagram illustrating a construction of an apparatus for identifying coordinates of a touch area, according to another embodiment of the present invention.

A reference signal level (which is detected when the touch is not input) detected through multiple second electrode lines 1113-1 to 1113-$n$ may be changed depending on a time due to environment factors. Accordingly, the apparatus of FIG. 11 monitors the signal level detected through the multiple second electrode lines 1113-1 to 1113-$n$ and modifies a fine signal change.

The apparatus for identifying the coordinates of the touch area of FIG. 11 has a construction that is substantially identical to that of FIG. 3. The detailed descriptions of the touch screen panel 1110, the signal generation unit 1120, the touch area coordinate identification unit 1140, and signal control unit 1150 are substantially identical to the descriptions of the touch screen panel 310, the signal generation unit 320 and the touch area coordinate identification unit 340 of FIG. 3. This includes the descriptions of components of these units, specifically, multiple first electrode lines 1111-1 to 1111-$n$, the multiple second electrode lines 1113-1 to 1113-$n$, an input signal generator 1121, a spread spectrum code generator 1123, a spread spectrum processor 1125, an amplifier 1127 an electrode selector 1129, ADC processors 1141-1, 1141-2, . . . , 1141-($n$-1), and 1141-$n$, a memory 1133, a digital filter 1145, a touch input identifier 1147, an input signal controller 1151, an output controller 1153 and a synchronization controller 1155.

A signal restoration unit 1130 includes multiple spread spectrum restoration units 1131-1 to 1131-$n$ connected to each of the multiple second electrode lines 1113-1 to 1113-$n$. The multiple spread spectrum restoration units 1131-1 to 1131-$n$ are configured to synchronize the same code as a spread spectrum code generated in the spread spectrum code generator 1123 and apply the synchronized code to the signal supplied from the multiple second electrode lines 1113-1 to 1113-$n$. The multiple spread spectrum restoration units 1131-1 to 1131-$n$ may be multipliers for multiplying the signals supplied from the multiple second electrode lines 1113-1 to 1113-$n$ by the spread spectrum code generated in the spread spectrum code generator 1123.

In order to remove the additional noise component distributed in a band other than the band of the signal transmitted from the signal generation unit 1120, the signal restoration unit 1130 further includes analog filters 1133-1, 1133-2, . . . , 1133-($n$-1), and 1133-$n$ connected to the spread spectrum restoration units 1131-1 to 1131-$n$, respectively, and configured to remove the predetermined frequency band including the noise component.

The apparatus of FIG. 11 monitors signal levels detected from the multiple second electrode lines 1111-1 to 1113-$n$ and modifies the fine signal change. Accordingly, the apparatus of FIG. 11 further includes DAs 1135-1, 1135-2, . . . , 1135-($n$-1), and 1135-$n$, a reference signal input unit 1163 for supplying a reference signal to the DAs 1135-1, 1135-2, . . . , 1135-($n$-1), and 1135-$n$, and a reference signal controller 1161 for controlling an output level of the reference signal input unit 1163.

The DAs 1135-1, 1135-2, . . . , 1135-($n$-1), and 1135-$n$ receive signals output from the spread spectrum restoration units 1131-1 to 1131-$n$ (or the analog filters 1133-1, 1133-2, . . . , 1133-($n$-1), and 1133-$n$) serving as a first input signal, respectively, and a signal output from the reference signal input unit 1163 serving as a second input signal. The DAs 1135-1, 1135-2, ..., 1135-(n-1) and 1135-n amplify a difference value between the first input signal and the second input signal.

The reference signal controller 1161 identifies a signal in the reference level converted to a digital value through the touch area coordinate identification unit 1140 and controls an output of the reference signal input unit 1163 such that the signal in the reference level has a predetermined value corresponding to a monitored signal level for each channel. Further, the reference signal input unit 1163 outputs an analog signal in the level controlled by the reference signal controller 1161 and inputs the analog signal to each of the DAs 1135-1, 1135-2, ..., 1135-(n-1), and 1135-n.

Figure 12:
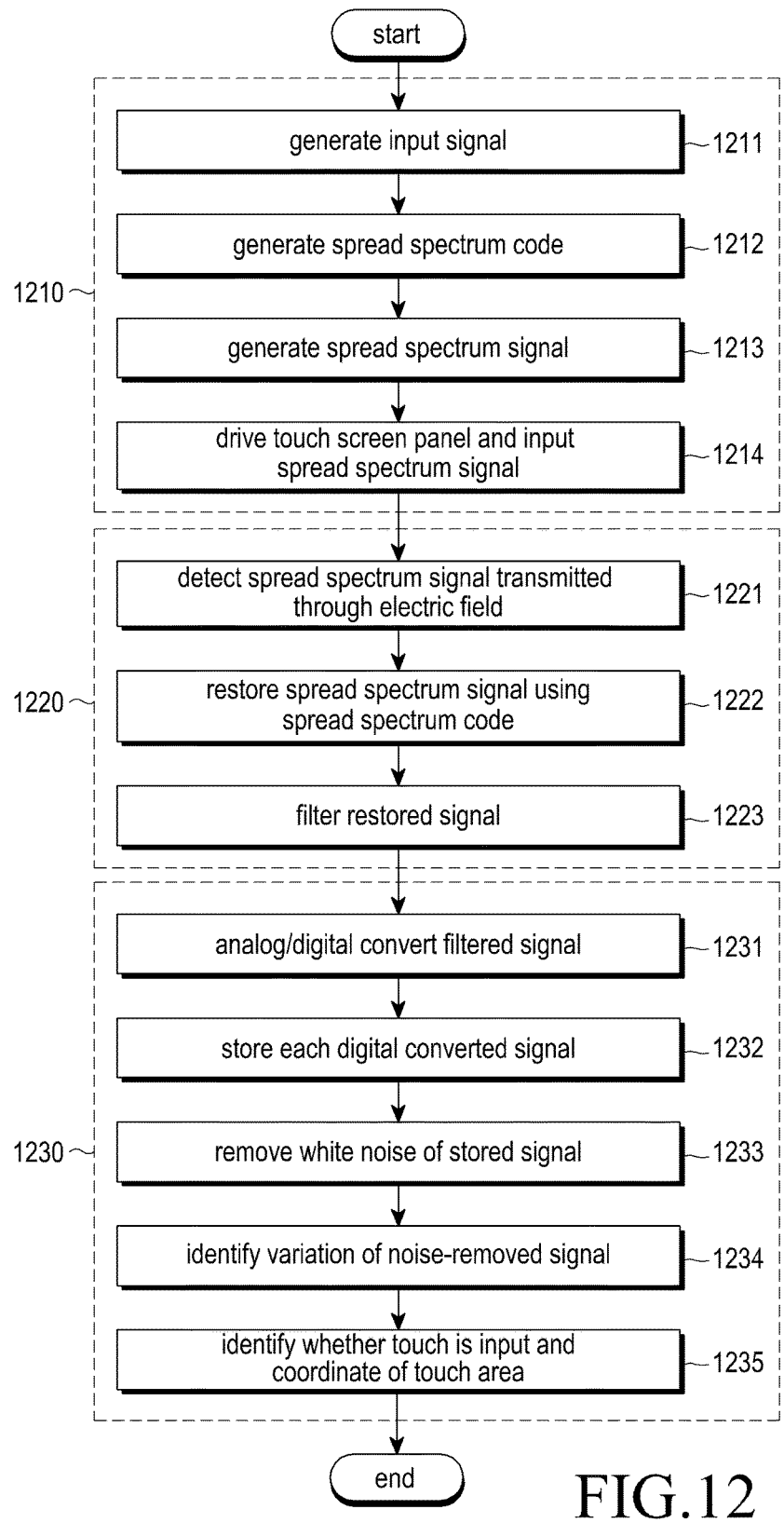
FIG. 12 is a flowchart illustrating a method of identifying coordinates of a touch area, according to an embodiment of the present invention.

FIG. 12 is a flowchart illustrating a method of identifying coordinates of a touch area, according to an embodiment of the present invention.

The method of identifying the coordinates of the touch area, according to an embodiment of the present invention, may be applied to a touch screen panel including a first electrode layer and a second electrode layer disposed in the apparatus as set forth in FIG. 3, for example.

A spread spectrum signal is generated in accordance with grouped steps 1210. A band restoration is processed for the signal in grouped steps 1220. Coordinates of a touch area are identified based on the band restored signal in grouped steps 1230.

Grouped steps 1210 includes step 1211, in which an input signal, i.e. a DC input signal, is generated having a predetermined level of a voltage, as illustrated in FIG. 4A. A spread spectrum code is generated in step 1212, as illustrated in FIG. 4B.

Although the input signal generated in step 1211 is the DC input signal having the predetermined level of a voltage value, embodiments of the present invention are not limited thereto, and the input signal may be a signal having a predetermined frequency band. When the input signal has a predetermined frequency band, a frequency of the spread spectrum code may have a relatively higher frequency than the frequency of the input signal. A spread spectrum multiple may be defined by a ratio of the frequency of the spread spectrum code to the frequency of the input signal. The spread spectrum multiple is a multiple of the frequency band spreading the noise, and an original power of the noise is reduced as much as a reciprocal of the spread spectrum multiple, so that it is preferable to set the spread spectrum multiple to be higher than 1.

In step 1213, the input signal and the spread spectrum code are multiplied so that a spread spectrum signal is generated.

In step 1214, the touch screen panel is driven and the spread spectrum signal is sequentially transmitted to the multiple first electrode lines included in the first electrode layer of the touch screen panel.

As such, when the spread spectrum signal is applied to the first electrode layer in step 1210, an electric field is generated between the first electrode layer and the second electrode layer, and the spread spectrum signal is transmitted to the second electrode layer through the electric field. A noise may be generated during the transmission of the spread spectrum signal through the electric field and included in the spread spectrum signal transmitted to the second electrode layer. Further, the touch screen panel is generally mounted while being overlapped with a display panel. The noise generated in the display panel may be included in the spread spectrum signal transmitted from the second electrode layer. Accordingly, the spread spectrum signal transmitted from the second electrode layer may include the noise illustrated in FIG. 4C.

Grouped steps 1220 includes step 1221, in which the spread spectrum signal transmitted from each of the second electrode lines included in the second electrode layer is detected. A band restoration for the detected spread spectrum signal is performed in step 1222. The noise included in the spread spectrum signal is removed in step 1223.

Specifically, in step 1222, the same code as the spread spectrum code generated in step 1212 is synchronized and the synchronized code is applied to the spread spectrum signal transmitted from the second electrode layer. The spread spectrum signal transmitted from the second electrode layer is multiplied by the spread spectrum code. Accordingly, the spread spectrum signal transmitted from the second electrode layer is band restored and the generated band-restored signal illustrated in FIG. 4D may be represented. In the band restored signal, the noise component is spread so that a signal strength of the noise component may be reduced.

According to the spread of the noise component of the band restored signal and the decrease of the signal strength of the noise component included in the band restored signal, a filtering of removing a frequency band other than the frequency band of the input signal generated in step 1222 from the band restored signal is performed in step 1223. Accordingly, it is possible to remove the noise component included in the band restored signal. For example, it is possible to remove the noise component of the band restored signal as illustrated in FIG. 4E.

Grouped steps 1230 includes step 1231 in which an analog/digital conversion processing is performed for each of the signals in which the noise component included in the band restored signal are removed. The converted signals are stored in a memory, in step 1232, in order to sequentially process the detected spread spectrum signals. In step 1233, a white noise included in the spread spectrum signal stored in the memory is removed. A change of the signals in which the noise is removed is identified in step 1234. In step 1235, it is determined whether the touch is input and the coordinates of the touch area are identified.

In step 1231, the analog/digital conversion processing is performed to each of the signals in which the noise component included in the band restored signal is removed. An example of the analog/digital converted signal is shown in FIG. 4F.

In step 1231, the analog/digital conversion processing is performed to each of the signals transmitted from the second electrode included in the second electrode layer. In order to sequentially process the analog/digital converted signals equal to the number of second electrode lines in steps 1233 to 1235, the analog/digital converted signals are stored in the memory in step 1232.

Further, even if the noise component of the band restored signal is removed through step 1223, a background white noise may be included in the band restored signal. Specifically, the background white noise may be evenly distributed in the entire band, so the background white noises may not be all removed only through a low-pass filtering, as shown in FIG. 4E. The background white is removed in step 1233. Through receiving sufficient data through an over sampling and applying a digital filter, such as a moving average filter when the analog digital converted signal shown in FIG. 4F is analog digital converted, it is possible to remove the background white noise. For example, it is possible to effectively remove the background white noise by using the digital filter, such as a discrete FIR filter for performing a finite impulse response filtering. Accordingly, as illustrated in FIG. 4G, the input signal generated in step 1210 may be finally restored.

Then, in step 1234, the variation of the restored input signals is identified. It is identified if the variation of the restored input signals has a value smaller than a predetermined signal size (e.g., a voltage value).

In step 1235, when the variation of the restored input signals has a value smaller than the predetermined signal size (e.g., a voltage value) or shows a change, it is identified that the touch is input. The first electrode line, through which the current input signal is input, among the first electrode lines of the first electrode layer and the second electrode line, through which the current input signal is output, among the second electrode lines of the second electrode layer are identified. A crossing point between the identified first electrode line and second electrode line may be identified as an area in which the touch is input.

The apparatus and the method of identifying the coordinates of the touch area applies the spread spectrum code to the input signal to generate the spread spectrum signal, applies the spread spectrum code identical to that applied to the input signal to the spread spectrum signal transmitted through the first and second electrode layers, and performs the band restoration, so that it is possible to effectively control the noise introduced from the panel and improve the signal-to-noise ratio of a touch sensing apparatus as much as the controlled noise.

Further, embodiments of the present invention adjust the length of the spread spectrum code, so it is possible to easily adjust a quantity of the noise control.

Embodiments of the present invention can freely set the position of the touch screen panel regardless of the position of the display panel.

The touch screen panel is fixed to a lower portion than the display panel, so that embodiments of the present invention can improve a quality of a displayed image.

Embodiments of the present invention apply the different spread spectrum codes to the input signals, so it is possible to simultaneously transmit the multiple input signals and effectively reduce a time required for scanning the signals of the entire channels.

Software components including instructions or code for performing the methodologies described herein may be stored in one or more of the associated memory devices (e.g., Read Only Memory (ROM), fixed or removable memory) and, when ready to be utilized, loaded in part or in whole (e.g., into Random Access Memory (RAM)) and executed by a Central Processing Unit (CPU).

While the invention has been shown and described with reference to certain embodiments thereof, it will be understood by those skilled in the art that various changes in form and detail may be made therein without departing from the spirit and scope of the invention as defined by the appended claims.

What is claimed is:
1. An apparatus for identifying coordinates of a touch area on a touch screen panel based on a capacitive scheme, the apparatus comprising:
the touch screen panel comprising a first electrode layer having first electrode lines aligned in a first direction and a second electrode layer having second electrode lines aligned in a second direction, wherein the second direction is different from the first direction, and wherein an electric field exists between the first electrode layer and the second electrode layer;
a signal generation unit for generating a spread spectrum signal and supplying the spread spectrum signal to the first electrode layer;
a signal restoration unit for processing a band restoration for a signal input from the second electrode layer, and
a touch area coordinate identification unit for identifying the coordinates of the touch area on the touch screen panel by using a signal input from the signal restoration unit,
wherein the signal generation unit comprises:
an input signal generator for generating an input signal required for identifying the coordinates of the touch area,
a spread spectrum code generator for generating a spread spectrum code for generating the spread spectrum signal with a higher frequency spectrum than a frequency spectrum of the input signal, and
a spread spectrum processor for combining the input signal and the spread spectrum code and generating the spread spectrum signal.

2. The apparatus as claimed in claim 1, wherein the signal generation unit further comprises a signal amplifier for amplifying the spread spectrum signal.

3. The apparatus as claimed in claim 1, wherein the signal generation unit further comprises an electrode selector that sequentially supplies the spread spectrum signal to the first electrode lines.

4. The apparatus as claimed in claim 1, wherein the signal generation unit further comprises an electrode selector that simultaneously supplies two or more different spread spectrum signals to two or more of the first electrode lines.

5. The apparatus as claimed in claim 4, wherein the two or more different spread spectrum signals are generated based on differently generated input signals required for identifying the coordinates of the touch area.

6. The apparatus as claimed in claim 4, wherein the signal restoration unit comprises:
a plurality of spread spectrum restoration units for processing a band restoration for signals input from the second electrode layer by using a spread spectrum code used for generation of the spread spectrum signal; and
a plurality of differential amplifiers each for amplifying a difference value between at least two signals input from at least two of the plurality of spread spectrum restoration units.

7. The apparatus as claimed in claim 6, wherein the signal restoration unit further comprises a plurality of filters for removing a predetermined frequency band including a noise component from a plurality of signals input from the plurality of differential amplifiers.

8. The apparatus as claimed in claim 4, wherein the signal restoration unit further comprises:
a plurality of spread spectrum restoration units for processing a band restoration for a plurality of signals input from the second electrode layer by using a spread spectrum code used for generation of the spread spectrum signal;
a plurality of differential amplifiers, each receiving a respective signal input from the plurality of spread spectrum restoration units as a first input signal and a signal being a reference of a differential amplification as a second input signal;
a reference signal input unit for providing the second input signal to each of the plurality of differential amplifiers; and
a reference signal controller for controlling a voltage value of the second input signal in response to a voltage value of a signal which is output from one of the plurality of differential amplifiers and identified in the touch area coordinate identification unit.

9. The apparatus as claimed in claim 1, wherein the signal restoration unit comprises a plurality of spread spectrum restoration units for processing a band restoration for each of a plurality of signals input from the second electrode layer by using a spread spectrum code used for generation of the spread spectrum signal.

10. The apparatus as claimed in claim 9, wherein the signal restoration unit further comprises a plurality of filters for removing a predetermined frequency band that includes a noise component from band restored signals which are input from the plurality of spread spectrum restoration units.

11. The apparatus as claimed in claim 10, wherein the signal restoration unit further comprises a plurality of signal amplifiers for amplifying a plurality of signals input from the plurality of filters in which the predetermined frequency band is removed.

12. The apparatus as claimed in claim 11, wherein the second electrode layer of the touch screen panel comprises a reference electrode formed in an area where a touch is not input by a user and configured to output a reference spread spectrum signal transmitted from the first electrode layer, and the signal restoration unit further comprises:
a reference spread spectrum restoration unit for processing a band restoration for a signal input from the reference electrode by using the spread spectrum code; and
a reference filter for removing the predetermined frequency band including the noise component from a band restored signal which is input from the reference spread spectrum restoration unit,
wherein the plurality of signal amplifiers comprise a plurality of differential amplifiers for amplifying a difference value between a signal output from the reference filter and each of signals input from the plurality of filters in which the predetermined frequency band is removed.

13. The apparatus as claimed in claim 1, wherein the touch area coordinate identification unit comprises:
an Analog-Digital Converter (ADC) processor for analog-digital converting a signal input from the signal restoration unit;
a moving average filter for averaging the analog-digital converted signal in a predetermined time unit; and
a touch input identifier for identifying a level change of the signal averaged in the predetermined time unit, and determining whether the touch is input and the coordinates of the area in which the touch is input.

14. The apparatus as claimed in claim 1, wherein the touch screen panel is overlapped with a display panel, and the first electrode layer and the second electrode layer are disposed on a lower surface of the display panel.

15. The apparatus as claimed in claim 1, wherein the touch screen panel is overlapped with a display panel, and at least one of the first electrode layer and the second electrode layer is disposed on an upper surface of the display panel.

16. A method of identifying coordinates of a touch area on a touch screen panel based on a capacitive scheme, the method comprising the steps of:
generating a spread spectrum signal and supplying the generated spread spectrum signal to a first electrode layer, wherein the first electrode layer is formed in the touch screen panel and has first electrode lines aligned in a first direction;
processing a band restoration for a signal input from a second electrode layer, which is formed in the touch screen panel and has second electrode lines aligned in a second direction, wherein the second direction is different from the first direction, and wherein an electric field exists between the first electrode layer and the second electrode layer;
identifying the coordinates of the touch area on the touch screen panel by using a band restored signal,
wherein supplying the spread spectrum signal to the first electrode layer comprises:
generating an input signal required for identifying the coordinates of the touch area,
generating a spread spectrum code for generating the spread spectrum signal with a higher frequency spectrum than a frequency spectrum of the input signal, and
combining the input signal and the spread spectrum code and generating two or more different spread spectrum signals; and
simultaneously supplying the two or more different spread spectrum signals to the first electrode lines.

17. The method as claimed in claim 16, wherein supplying the spread spectrum signal to the first electrode layer comprises sequentially supplying the spread spectrum signal to the first electrode lines.

18. An article of manufacture for identifying coordinates of a touch area on a touch screen panel based on a capacitive scheme, comprising a machine non-transitory readable medium containing one or more programs which when executed implement the steps of:
generating a spread spectrum signal and supplying the generated spread spectrum signal to a first electrode layer, wherein the first electrode layer is formed in the touch screen panel and has first electrode lines aligned in a first direction;
processing a band restoration for a signal input from a second electrode layer, which is formed in the touch screen panel and has second electrode lines aligned in a second direction, wherein the second direction is different from the first direction, and wherein an electric field exists between the first electrode layer and the second electrode layer; and
identifying the coordinates of the touch area on the touch screen panel by using a band restored signal,
wherein supplying the spread spectrum signal to the first electrode layer comprises:
generating an input signal required for identifying the coordinates of the touch area,
generating a spread spectrum code for generating the spread spectrum signal with a higher frequency spectrum than a frequency spectrum of the input signal, and
combining the input signal and the spread spectrum code and generating two or more different spread spectrum signals; and
simultaneously supplying the two or more different spread spectrum signals to the first electrode lines.

* * * * *